United States Patent Office 3,245,726
Patented Apr. 12, 1966

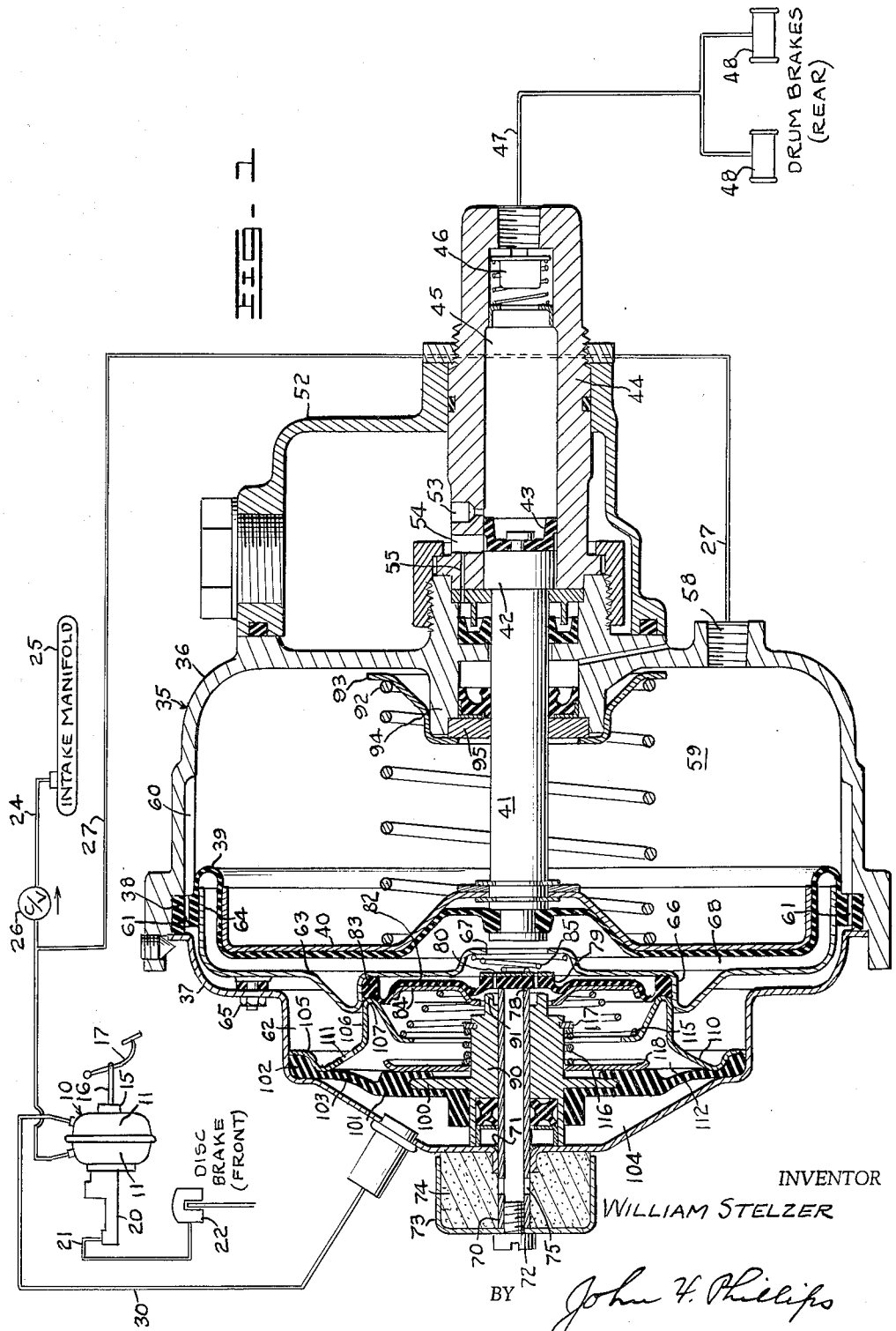

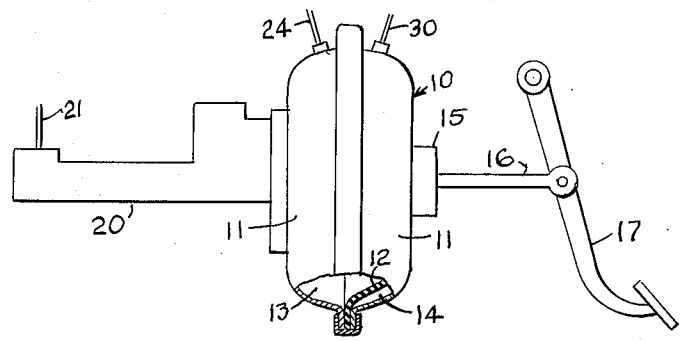
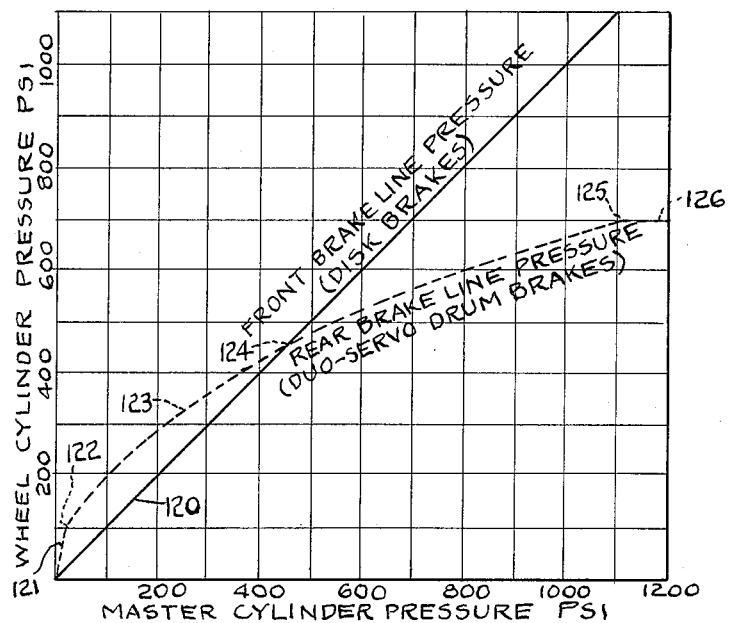

3,245,726
FRONT AND REAR VEHICLE BRAKE
PROPORTIONING MECHANISM
William Stelzer, Bloomfield Hills, Mich., assignor to Kelsey-Hayes Company, Romulus, Mich., a corporation of Delaware
Filed July 8, 1964, Ser. No. 381,090
15 Claims. (Cl. 303—6)

This invention relates to a front and rear vehicle brake proportioning mechanism, and has particular reference to a vehicle provided at its forward end with disc brakes and at its rear end with drum brakes, to produce a desired brake torque output from the different brakes and during different phases of operation or deceleration.

At present, in vehicles using disc brakes at the front wheels and drum brakes at the rear wheels, a proportioning valve is used in the rear brake line to relatively reduce the pressure supplied to the drum brakes as the master cylinder pressure is increased, and a metering or pressure-retarding valve in the front brake line is used to hold back the pressure to the front disc brakes in the initial state of brake operation, to compensate for the use of the return springs in the rear brakes, which springs are not used in the disc brakes, where higher pressure is required to produce a brake torque.

An important object of the present invention is to provide a novel brake operating system which eliminates the need for proportioning and metering valves in motor vehicles having front disc brakes and rear drum brakes, while at the same time supplying the extra power needed when disc brakes are used at the front wheels.

A further object is to eliminate the special bigger power unit which is needed to produce the necessary hydraulic pressure at the front disc brakes, the present system employing a conventional front wheel brake power unit with a smaller master cylinder to serve the disc brakes only, the rear drum brakes being operated by a slave power unit which delivers pressure to the rear drum brakes only.

A further object is to provide in such a system or mechanism a novel type of slave motor for the rear brakes which operates very efficiently in cooperation with the front wheel brake master motor, the slave motor unit being controlled by the energizing pressure of the pressure-operated master motor unit and the system functioning to proportion the power to produce a higher hydraulic pressure output in the initial state of rear brake application and then gradually reducing the rate of increase until maximum pressure is reached.

A further object is to provide such a mechanism wherein pressure produced at the rear wheel brakes is proportioned relative to that produced by the master motor unit to compensate for vehicle weight transfer caused by the deceleration of the vehicle, thus substantially eliminating the locking and sliding of the rear wheels.

A further object is to take advantage of the dividing of the hydraulic system into two separate circuits so that the safety of the system is improved, the breaking of one circuit not affecting the other, so that the vehicle under such conditions may be brought to a stop.

Other objects and advantages of the invention will become apparent during the course of the following description.

In the drawings I have shown one embodiment of the invention. In this showing

FIGURE 1 is a diagrammatic showing of the system as a whole, the slave motor being structurally illustrated in axial section, FIGURE 2 is a side elevation of the master motor, slightly enlarged over FIGURE 1, parts being broken away, and FIGURE 3 is a graph illustrating relative front and rear brake line pressures in different stages of brake operation.

Referring to FIGURES 1 and 2, the master motor is indicated as a whole by the numeral 10 and may be of any conventional type, in the present instance of the vacuum suspended type. The motor 10, for example, may be of the type shown in prior Patent No. 2,735,268, granted February 21, 1956. The motor 10 comprises casing sections 11 divided by a pressure responsive unit 12 to define a constant pressure chamber 13 and a variable pressure or working chamber 14. A suitable motor control valve mechanism, which may be generally indicated by the numeral 15, is operated by a push rod 16 connected to the brake treadle 17.

The motor 10 operates the piston (not shown) of a conventional master cylinder 20 having a hydraulic line 21 connected to the front wheel brakes which in the present system are of the disc type and one of which is diagrammatically indicated as at 22. The constant pressure chamber 13 of the motor 10 is connected through a vacuum line 24 to the intake manifold 25 of the vehicle engine, and is preferably the source of vacuum employed for operating the motor 10. A check valve 26 is connected in the line 24, and between this check valve and the chamber 13 a vacuum line 27 is tapped into the line 24 and connected to the slave motor to be described.

In accordance with conventional practice, the motor 10 is vacuum-suspended, the vacuum in the chamber 13 being normally communicated to the chamber 14. Operation of the brake pedal 16 conventionally disconnects the chambers 13 and 14 and admits air into the chamber 14 to operate the pressure-responsive unit 12 of the motor 10 and thus displace hydraulic fluid from the master cylinder 20 to the front brakes 22. A fluid pressure line 30 has one end tapped into the chamber 14 and has its other end connected with the slave motor, to be described, whereby the latter motor is operated by the pressure admitted to the chamber 14 of the motor 10.

The slave motor is indicated as a whole by the numeral 35 and comprises a housing 36 and cover 37, and the peripheral bead 38 of a diaphragm 39 is clamped between the housing 36 and cover 37. This diaphragm lies against a supporting plate 40 fixed to the piston rod 41 of a master cylinder piston 42 having the usual cup seal 43. The piston 42 operates in a master cylinder 44 and forms with the outer end thereof a pressure chamber 45 from which fluid is displaced through a conventional residual pressure valve 46 to one end of a hydraulic line 47. This line supplies hydraulic fluid to the cylinders 48 of conventional drum brakes at the rear of the vehicle.

A reservoir 52 communicates with the chamber 45 through a compensating port 53 when the piston 42 is in normal position to replenish fluid in such chamber. A larger port 54 communicates through a passage 55 behind the piston 42.

As previously stated, the vacuum line 27 has one end connected to the vacuum line 24 and the other end of this line communicates through a port 58 with a slave motor chamber 59 formed by the diaphragm 39 and housing 36. The chamber 59 communicates through one or more grooves 60 and one or more passages 61 through the diaphragm bead 38, with a chamber 62 formed in the cover 37. Accordingly, vacuum is always present in the chamber 62. To the left of the diaphragm 39 is arranged a plate 63 having an annular peripheral flange 64 snugly fitting within the diaphragm bead 38 and connected as at 65 to the cover 37. The plate 63 is provided with an nnular shoulder 66 for a purpose to be described, and the plate has an axial opening 67 through which pressures are controlled in the chamber 68 formed between the diaphragm 39 and plate 63.

The cover 37 carries an atmospheric tube 70 axially thereof and preferably welded thereto as at 71 to maintain the tube in fixed axial position. The tube projects axially beyond the cover 37 and has fixed thereto as at 72 a shell 73 containing air filtering material 74. Air is admitted to the tube 70 through ports 75.

The inner extremity of the tube 70 forms an annular valve seat 78 normally engaged by a resilient valve 79 apertured as at 80 radially outwardly of the tube 70. The valve 79 is integral with a diaphragm 82 having a radially outer bead 83 seating within the annular shoulder 66, and the diaphragm 82 is backed up by a plate 84, further referred to below. A spring 85 engages the plate 63 to bias the valve 79 toward the left in FIGURE 1.

A piston 90 slidably surrounds the air tube 70 in sealed relation therewith and is provided at its inner end with an annular valve seat 91 surrounding and concentric with the valve seat 78 and spaced therefrom. The valve seat 91 is normally spaced from the valve 79 as shown in FIG-URE 1. Therefore, the chamber 68 communicates with the chamber 62, as will become more apparent below, and accordingly, vacuum will normally be maintained in the chamber 68 to pressure-balance the diaphragm 39. This diaphragm is biased to its normal position shown by a spring 92, one end of which engages a plate 93 surrounding a hub 94 formed integral with the housing 36, and this hub 94 also carries a bearing 95 supporting the piston rod 41.

The piston 90 is provided with an annular flange 100 engaging in the radially inner portion of a diaphragm 101 having an outer bead 102 engaging the cover 37. The diaphragm 101 has a relatively highly flexible annular portion 103 for a purpose to be described. The diaphragm 101 forms with the adjacent end of the cover 37 a chamber 104 communicating with the line 30.

The bead 102 is maintained in position by a radially outer flange 105 formed on a plate 106 provided with an annular extension 107 which seats against the bead 83 of the diaphragm 82 to maintain such bead in position. The plate 106 is provided with a frusto-conical portion 110 extending inwardly away from the diaphragm portion 103, and such portion of the plate 105 is apertured as at 111 to connect the chamber 62 with the space 112 to the right of the diaphragm 101 so that the space 112, in effect, is a part of the chamber 62. The plate 106 is open at its center as shown.

A counter-reaction spring 115 is arranged between the plates 84 and 106 and functions in a manner to be described. Another spring 116 engages at one end against a snap ring 117 carried by the piston 90 and a plate 118 engaging against the radially inner portion of the diaphragm 102.

The graph in FIGURE 3 represents the relationship between wheel cylinder pressures and master cylinder pressures under different operating conditions. As shown, wheel cylinder pressures are graduated up to 1,100 p.s.i. and master cylinder pressures are graduated up to 1,200 p.s.i. Starting at the zero point, front brake line pressures to the disc brakes will progressively increase with progressive energization of the motor 10 as indicated by the line 120. The motor 35 is subject to energization, as described below, by the admission of air into the operating chamber of the motor 10. Upon initial energization of the motor 35, pressure in the master cylinder chamber 45 for the rear brakes increases rather abruptly as at 121, and due to the automatic controlling of the motor 35, as described below, modulation of the slave motor operation starts to take place at the point 122, pressures in the rear wheel cylinders then increasing as indicated by the line 123, the rate of increase in such pressure progressively diminishing. At the point 124 where the line 123 crosses the line 120, the front and rear brake line pressures will be equal, and beyond such point, pressure in the rear wheel cylinders increases but at a lower rate than the pressure increase in the front wheel brake lines until the point 125 is reached. This point represents the point of power run-out of the motor 35, that is, the point where the motor 35 is energized to a maximum extent. Beyond such point, rear wheel brake pressures remain constant as represented by the line 126 while front line pressures are free to continue to increase.

Operation

The parts of the slave motor unit are shown in normal or released positions. The pressure on the brake pedal 17, in accordance with conventional booster motor practice, disconnects the fixed vacuum chamber 13 from the operating chamber 14 and admits air to the latter through the means provided for this purpose in the valve mechanism 15. This operation not only moves the pressure responsive unit of the master motor 10, but also admits air from the chamber 14 through line 30 to the chamber 104. As previously stated, vacuum is maintained in the chamber 62, and pressure in the chamber 104 moves the diaphragm 101 and piston 90 to the right, engaging the valve seat 91 with the valve 79, thus cutting off vacuum communication between the chambers 62 and 68. Slight further movement of the piston 90 then moves the valve 79 from the seat 78, and air will be admitted through the tube 70 and through passages 80 to the motor chamber 68, whereupon the pressure-responsive diaphragm 39 and plate 40 will move to the right. Similar movement, of course, will be imparted to the master cylinder plunger 42 to displace fluid from the chamber 45 to the rear wheel brake cylinders.

In the initial stage of slave motor operation, the counter-reaction spring 115 holds off the diaphragm 82 so that a relatively high pressure is built up immediately in the hydraulic chamber 45. In other words, opposed solely by the light spring 85, the valve 79 is initially movable with little force by the piston 90 to initially admit air to the motor chamber 68. It will be noted that the relatively large area of the diaphragm 101 renders it sensitive to an initial very slight increase in pressure in the chamber 104. It is for this reason that rear wheel cylinder pressures initially rise abruptly as at 121 (FIGURE 3).

Further depression of the brake pedal increases pressure in the line 30 and motor chamber 104, and the higher pressure in the chamber 68, acting against the diaphragm 82, causes the counter-reaction spring 115 to start to yield and the flexing of the diaphragm 82 causes the plate 84 to engage the adjacent shoulder on the piston 90 and to transmit a reaction force to the diaphragm 101. This provides a desired modulation of control pressure in the motor chamber 68 versus pressure transmitted from the master motor unit. Resisting movement of the piston 90, therefore, starts to reduce the rate of increase in pressure and thus the effective pressure developed in the slave motor.

Upon a further increase in pressure in the chamber 104, acting to the right against the diaphragm 101, the spring 116 starts to yield, allowing the plate 118 and the adjacent portion of the diaphragm 101 to move to the right. The portion 103 of the diaphragm 101 will be flexed by pressure in the chamber 104 and will be moved against the frusto-conical portion 110 of the plate 106, thus reducing the effective area of the diaphragm 102 subject to pressure in the chamber 104. It is desirable that the spring 116 have a relatively high rate so that the transition of the effective area of the diaphragm 101 is spread over a greater range. To obtain the desired effect, the configuration of the contacting surface 110 may be such that the effective area of the diaphragm 101 becomes progressively smaller whereby the output hydraulic pressure approximates that represented by the curve 123 (FIGURE 3).

It will be apparent that while air pressure from the master motor chamber 14 provides the power for operating the slave motor, the latter is controlled by the various elements associated with the valve mechanism thereof. The controlling of the operation of the slave motor takes place so as to proportion the power of the two motors to produce a higher hydraulic pressure output in the initial stage of brake application at the rear wheels, and then to gradually reduce the rate of increase until maximum pressure is reached. Such pressure is proportioned relative to that produced by the master motor unit to compensate for vehicle weight transfer caused by the deceleration of the vehicle. Since the ideal pressure ratio plotted according to vehicle weight transfer due to deceleration takes the shape of a curve, it will be apparent that it is possible with the present construction to come very close to the ideal pressure distribution. The greater the brake pressure developed for rapid deceleration, the lower will be the rear brake pressures relative to the front brake pressures, as will be apparent from the graph in FIGURE 3.

The point 125 in the graph represents the power run-out of the slave motor, that is, the point of maximum energization of the slave motor, which occurs when pressures in the chambers 68 and 104 and the atmosphere are the same. In the example shown, motor-generated hydraulic pressure in the rear wheel cylinders would reach a maximum at about 700 p.s.i., while the maximum hydraulic pressure in the front hydraulic line would be 1,100 p.s.i. Of course, with a conventional booster motor 10, the operator may apply foot pressures to continue to raise pressure in the front wheel brakes beyond the point of power run-out of the motor 10. This cannot be done with the rear master cylinder, however, since no pressures can be built up therein beyond the point of power run-out of the slave motor.

When the brake pedal is released, the pressures in going down will maintain the same relation as they did when going up. In accordance with conventional practice, releasing the brake pedal 17 disconnects the motor chamber from the atmosphere and connects it to the vacuum chamber 13. Accordingly, the chamber 14 will be evacuated as will the slave motor chamber 104. Balanced vacuum conditions will be re-established in all of the various chambers of the slave motor. The spring 85, no longer overcome by higher pressure at the left of the diaphragm 101, will move the valve 79 back to its normal position; the counter-reaction spring 115 will expand, and the same is true with the spring 116 which will restore the diaphragm 102 to its normal shape.

It is to be understood that the form of the invention shown and described is to be taken as a preferred example of the same and that various changes in the shape, size, and arrangement of the parts may be made as do not depart from the spirit of the invention or the scope of the appended claims.

I claim:

1. In a brake mechanism for a motor vehicle having front and rear brakes and front and rear hydraulic lines leading respectively thereto, a first master cylinder connected to said front hydraulic line, a master motor connected to said first master cylinder to operate it, a source of power for said master motor, manually operable means for controlling the supplying of power to said master motor, a second master cylinder connected to said rear hydraulic line, and a slave motor connected to said second master cylinder, said slave motor having a control mechanism for controlling its energization, a control device connected to said control mechanism and connected to said master motor to be subject to operation thereof and immediately operable upon initial operation of said master motor to operate said slave motor to supply higher hydraulic pressure to said rear hydraulic line than said master motor supplies to said front hydraulic line, and means subject to progressively increasing energization of said slave motor for opposing operation of said control device at a progressively greater rate than the rate of increased energization of said slave motor whereby the rate of increase in pressure in said second master cylinder diminishes below the rate of increase in pressure in said first master cylinder.

2. In a brake mechanism, a motor vehicle having front and rear brakes and front and rear hydraulic lines leading respectively thereto, a first master cylinder connected to said front hydraulic line, a fluid pressure operated master motor connected to said first master cylinder to operate it, a source of pressure, manually operable means for controlling the connection of said master motor to said source, a second master cylinder connected to said rear hydraulic line, and a fluid pressure slave motor connected to said second master cylinder, said slave motor having a control valve mechanism for controlling its energization, a control device comprising a chamber connected to said master motor and a pressure responsive element responsive to pressure supplied to said master motor, said pressure responsive element being connected to said valve mechanism to be subject to operation by pressure in said master motor immediately upon initial operation thereof to operate said slave motor to supply higher hydraulic pressures to said rear hydraulic line than said master motor supplies to said front hydraulic line, and modulating means subject to progressively increasing energization of said slave motor for opposing operation of said pressure responsive element at a progressively greater rate than the rate of increased energization of said slave motor whereby the rate of increase in pressure in said second master cylinder diminishes below the rate of increase in pressure in said first master cylinder.

3. A brake mechanism according to claim 2 wherein said slave motor is provided with a pressure-responsive unit connected to said second master cylinder and a working chamber at one side of said unit, said modulating means being subject to progressively increasing pressure in said working chamber for progressively opposing operation of said pressure-responsive element whereby the rate of increase in pressure in said working chamber and said second master cylinder diminshes below the rate of which progressive energization of said master cylinder increases pressure in said first master cylinder.

4. In a brake mechanism for a motor vehicle having front and rear brakes and front and rear hydraulic lines leading respectively thereto, first and second master cylinders connected respectively to said front and rear hydraulic lines, a fluid pressure operated master motor connected to said first master cylinder to operate it and having a working chamber, a source of pressure for said master motor, manually operable means for controlling the supply of pressure fluid to said working chamber, a fluid pressure operated slave motor connected to said second master cylinder and having a working chamber, a valve mechanism for controlling the admission of pressure to said working chamber of said slave motor, a control chamber in said slave motor connected to said working chamber of said master motor, a pressure-responsive element connected to said valve mechanism and subject to pressure in said control chamber to operate said slave motor as pressure is admitted to said working chamber of said master motor, and means operative as pressures in said working chamber of said slave motor progressively increase for progressively opposing operation of said pressure-responsive element at a progressively greater rate than the rate of increase in pressure in said working chamber of said slave motor whereby the rate of increase in pressure in said working chamber of said slave motor progressively diminishes below the rate of increase in pressure in said working chamber of said master motor.

5. In a brake mechanism for a motor vehicle having front and rear brakes and front and rear hydraulic lines leading respectively thereto, first and second master cylders connected respectively to said front and rear hydraulic lines, a fluid pressure operated master motor connected to said first master cylinder to operate it and having a working chamber, a source of pressure for said master motor, manually operable means for controlling the supply of pressure fluid to said working chamber, a fluid pressure operated slave motor connected to said second master cylinder and having a working chamber, a valve mechanism for controlling the admission of pressure to said working chamber of said slave motor, control chamber in said slave motor connected to said working chamber of said master motor, a pressure-responsive diaphragm connected to said valve mechanism and subject to pressure in said control chamber to operate said slave motor as pressure is admitted to said working chamber of said master motor, and means engaging said diaphragm to reduce its effective area subject to pressure in said control chamber as pressure increases therein.

6. A brake mechanism according to claim 5 provided with means subject to pressure in said working chamber of said slave motor for progressively opposing operation of said diaphragm by increasing pressures in said control chamber to progressively decrease the rate of increase in pressures in said working chamber of said slave motor relative to the rate of increase in pressures in said working chamber of said master motor.

7. A brake mechanism according to claim 5 provided with a reaction diaphragm subject to pressure in said working chamber of said slave motor, for progessively opposing operation of said first-named diaphragm by increasing pressures in said control chamber, to progressively decrease the rate of increase in pressures in said working chamber of said slave motor relative to the rate of increase in pressures in said working chamber of said master motor, and a counter-reaction spring for rendering said reaction diaphragm inoperative during initial operation of said slave motor.

8. In a brake mechanism for a motor vehicle having front and rear brakes and front are rear hydraulic lines leading respectively thereto, first and second master cylinders connected respectively to said front and rear hydraulic lines, a fluid pressure operated master motor having a pressure-responsive unit connected to said first master cylinder, a slave motor having a pressure-responsive unit connected to said second master cylinder, a source of pressure for said motors, each motor having a constant low-pressure chamber at one side of its pressure-responsive unit and a working chamber at the other side of its pressure-responsive unit, manually operable means for controlling the connection of said working chamber of said master motor with said source, a low-pressure control chamber in said slave motor in fixed communication with said constant low-pressure chamber thereof, a variable pressure control chamber in said slave motor communicating with said working chamber of said master motor, said low-pressure control chamber normally communicating with the working chamber of said slave motor, a valve mechanism movable for disconnecting said low-pressure control chamber from said working chamber of said slave motor and connecting the latter to said pressure source, a pressure-responsive element separating said control chambers and connected to said valve mechanism to operate said valve mechanism when pressure is admitted to said variable pressure control chamber from the working chamber of said master motor, means subject to pressure in said working chamber of said slave motor after such pressure has increased to a predetermined extent for opposing operation of said valve mechanism at a progressively greater rate than the rate of increase in pressure in said working chamber of said slave motor, whereby the rate of increase in pressure in said working chamber of said slave motor diminishes below the rate of increase in pressure in said working chamber of said master motor.

9. In combination with a motor vehicle having front disc brakes and rear drum brakes and front and rear hydraulic lines leading respectively thereto, first and second master cylinders connected respectively to said front and rear hydraulic lines, a fluid pressure operated master motor connected to said first master cylinder to operate it and having a working chamber, a fluid pressure operated slave motor connected to said second master cylinder and having a working chamber, a source of pressure for said motors, manually operable means for controlling the flow of pressure from said source to the working chamber of said master motor, a valve mechanism for controlling the admission of pressure from said source to said working chamber of said slave motor, a control chamber in said slave motor communicating with said working chamber of said master motor, a pressure-responsive element connected to said valve mechanism and subject to pressure in said control chamber, said pressure-responsive element comprising a diaphragm of substantial area to be instantly sensitive to increases in pressure in said control chamber to instantly operate said slave motor as pressure is admitted to said working chamber of said master motor, and means operable after an initial increase in pressure in said working chamber of said slave motor for progressively opposing movement of said diaphragm at a rate greater than the rate of increase in pressure in said control chamber to thereby diminish the rate of increase in pressure in said working chamber of said slave motor below the rate of increase in pressure in said working chamber of said master motor.

10. The combination defined in claim 9 wherein said means for opposing operation of said diaphragm comprises a second diaphragm subject to pressures in said working chamber of said slave motor, and means for transmitting force from said second diaphragm to said first diaphragm to oppose movement thereof.

11. The combination defined in claim 9 wherein said means for opposing operation of said diaphragm comprises a second diaphragm subject to pressures in said working chamber of said slave motor, means for transmitting force from said second diaphragm to said first diaphragm to oppose movement thereof, and means for diminishing the effective area of said first-named diaphragm subject to pressure in said control chamber after such pressure increases above a predetermined point.

12. A fluid pressure motor comprising a housing, a pressure-responsive unit dividing said housing to form a constant low-pressure chamber and a working chamber normally connected to said constant low-pressure chamber, a source of pressure for said motor, a valve mechanism for controlling the connection of said source to said working chamber, a control chamber in said motor, a diaphragm subject to increases in pressure in said control chamber and connected to said valve mechanism to operate it to disconnect said working chamber from said constant low-pressure chamber and to connect said working chamber to said source, means for supplying controlled fluid pressure to said control chamber, means exposed to pressure in said working chamber and operative after pressure therein has been built up to a predetermined extent by operation of said valve mechanism for progressively opposing operation of said diaphragm, said diaphragm being of substantial area to be initially sensitive to slight increases in pressure in said control chamber, and means for progressively reducing the effective area of said diaphragm subject to pressure in said control chamber as pressure in the latter progressively increases.

13. A fluid pressure motor comprising a housing, a pressure responsive unit dividing said housing to form a constant low-pressure chamber connected to a source of vacuum and a working chamber normally connected to said constant low-pressure chamber, a valve mechanism comprsing an axial air pipe open at one end to the atmosphere externally of said motor and projecting into said motor to communicate with said working chamber, the inner end of said air pipe comprising a valve seat, a valve normally engaging said seat to disconnect said working chamber from said air pipe, and a sleeve axially slidable on said air pipe and having a valve seat engageable with but normally disengaged from said valve, a diaphragm subject to pressures in a control chamber and connected to said sleeve to effect movement thereof to engage said second-named valve seat with said valve to disconnect said working chamber from constant low-pressure chamber and to move said valve from said first-named seat to connect said air pipe to said working chamber, means for supplying controlled fluid pressure to said control chamber, and means exposed to pressure in said working chamber and operative after pressure therein has been built up to a predetermined extent by operation of said valve mechanism for progressively opposing operation of said diaphragm.

14. A fluid pressure motor according to claim 13 wherein said means exposed to pressure in said working chamber for opposing operation of said diaphragm comprises a second diaphragm integral with said valve.

15. A fluid pressure motor according to claim 13 wherein said means exposed to pressure in said working chamber for opposing operation of said diaphragm comprises a second diaphragm integral with said valve, said second diaphragm being mechanically engageable with said sleeve, and a counter-reaction spring engaging said second diaphragm for delaying such engagement thereof with said sleeve.

References Cited by the Examiner
UNITED STATES PATENTS

| | | | |
|---|---|---|---|
| 2,373,272 | 4/1945 | Stelzer | 91—434 |
| 2,947,387 | 8/1960 | Price | 303—6 |
| 3,032,064 | 5/1962 | Price et al. | 91—434 |
| 3,090,650 | 5/1963 | Stelzer | 303—6 |
| 3,093,119 | 6/1963 | Stelzer | 91—434 X |

BENJAMIN HERSH, *Primary Examiner.*

EUGENE G. BOTZ, *Examiner.*

M. S. SALES, *Assistant Examiner.*